United States Patent [19]

Jung

[11] Patent Number: 5,654,761
[45] Date of Patent: Aug. 5, 1997

[54] IMAGE PROCESSING SYSTEM USING PIXEL-BY-PIXEL MOTION ESTIMATION AND FRAME DECIMATION

[75] Inventor: Hae-Mook Jung, Seoul, Rep. of Korea

[73] Assignee: Daewoo Electronics Co, Ltd, Seoul, Rep. of Korea

[21] Appl. No.: 393,291

[22] Filed: Feb. 23, 1995

[51] Int. Cl.$^6$ ............................... H04N 7/30; H04N 7/50
[52] U.S. Cl. ..................... 348/416; 348/402; 348/699
[58] Field of Search ............................ 348/402, 416, 348/699; H04N 7/30, 7/50

[56] References Cited

U.S. PATENT DOCUMENTS 5,113,255   5/1992   Nagata .................................... 348/416

OTHER PUBLICATIONS

J. Nieweglowski et al., "Motion Compensated Video Sequence Interpolation using Digital Image Warping", ICASSP '94–IEEE International Conference on Acoustics, Speech and Signal Processing, vol. 5, pp. 205–208, Apr. 1994.

G. Sullivan and R.L. Baker, "Motion Compensation for Video Compression using Control Grid Interpolation", ICASSP '91–International Conference on Acoustics, Speech and Signal Processing, vol. 4, pp. 2713–2716, Apr. 1991.

J. Nieweglowski et al., "A Novel Video Coding Scheme based on Temporal Prediction using Digital Image Warping", IEEE Transactions on Consumer Electronics, vol. 39, pp. 141–150, Aug. 1993.

J.K. Kim and C.M. Kyung, "Fast frame-to-frame Interpolation Technique for Scenes Containing Moving Objects", Electronics Letters, vol. 27, pp. 1788–1790, Sep. 1991.

G. Kummerfeldt et al., "Coding Television Signals at 320 and 64 Kbit/s", SPIE–Image Coding, vol. 594, pp. 119–128, Dec. 1985.

A. Furukawa et al., "Motion–Adaptive Interpolation for Videoconference Pictures", ICC'84–IEEE International Conference on Communications, vol. 2, pp. 707–710, May 1984.

C. Cafforio et al., "Motion Compensated Image Interpolation", IEEE Transactions on Communications, vol. 38, pp. 215–222, Feb. 1990.

*Primary Examiner*—Howard W. Britton
*Attorney, Agent, or Firm*—Anderson Kill & Olick P.C.

[57] ABSTRACT

An image processing system for processing a video signal has an encoder and a corresponding decoder wherein the encoder includes a frame decimator; a current frame prediction block for estimating displacements between a previous and a current frames provided from the frame decimator, and providing a predicted current frame based on the displacements; and a subtractor for providing a difference between the predicted and the original current frames and providing motion vectors representing the displacement, and the decoder includes a current frame prediction block for estimating displacements between the previous and the current frames and compensating the previous frame with the displacements to reconstruct the predicted current frame; and an adder for adding the reconstructed predicted current frame with the difference, to thereby reconstruct the current frame.

4 Claims, 4 Drawing Sheets

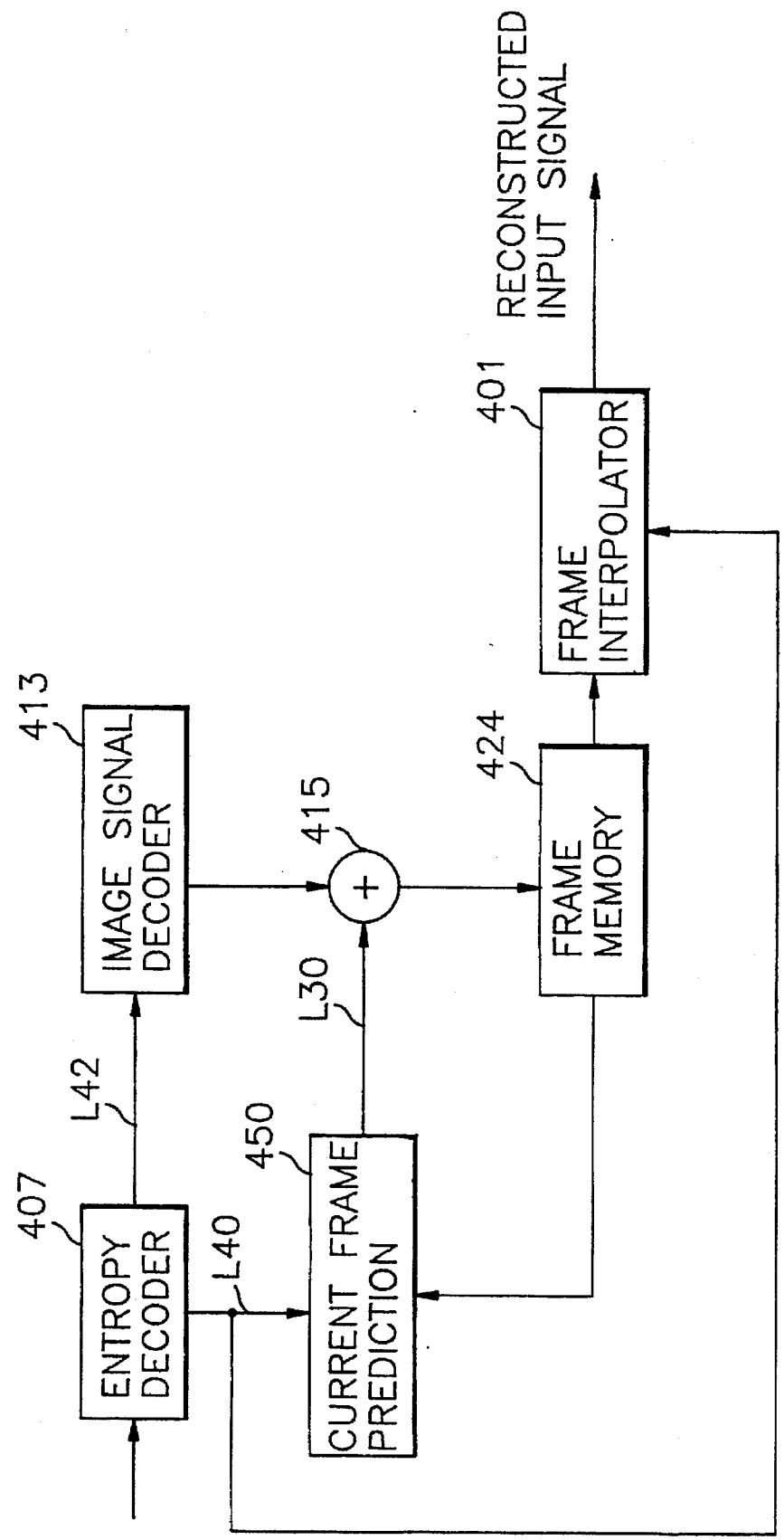

IMAGE PROCESSING SYSTEM USING PIXEL-BY-PIXEL MOTION ESTIMATION AND FRAME DECIMATION

FIELD OF THE INVENTION

The present invention relates to an image processing system for encoding and decoding a video signal; and, more particularly, to an image processing system for encoding and decoding a video signal by using a motion estimation and compensation technique on a pixel-by-pixel basis and a frame decimation technique.

DESCRIPTION OF THE PRIOR ART

As is well known, transmission of digitized video signals can deliver video images of much higher quality than the transmission of analog signals. When an image signal comprising a sequence of image "frames" is expressed in a digital form, a substantial amount of data is generated for transmission, especially in the case of a high definition television system. Since, however, the available frequency bandwidth of a conventional transmission channel is limited, in order to transmit the substantial amounts of digital data through the limited channel bandwidth, it is inevitable to compress or reduce the volume of the transmission data. Among various video compression techniques, the so-called hybrid coding technique, which combines temporal and spatial compression techniques together with a statistical coding technique, is known to be most effective.

Most hybrid coding techniques employ a motion compensated DPCM(differential pulse code modulation), two-dimensional DCT(discrete cosine transform), quantization of DCT coefficients, and VLC(variable length coding). The motion compensated DPCM is a process of determining the movement of an object between a current frame and its previous framer and predicting the current frame according to the motion flow of the object to produce a differential signal representing the difference between the current frame and its prediction. This method is described, for example, in Staffan Ericsson, "Fixed and Adaptive Predictors for Hybrid Predictive/Transform Coding", *IEEE Transactions on Communications*, COM-33, No. 12(December 1985); and in Ninomiya and Ohtsuka, "A Motion-Compensated Interframe Coding Scheme for Television Pictures", *IEEE Transactions on Communications*, COM-30, No. 1 (January 1982).

Specifically, in the motion compensated DPCM, current frame data is predicted from the corresponding previous frame data based on an estimation of the motion between the current and the previous frames. Such estimated motion may be described in terms of two dimensional motion vectors representing the displacement of pixels between the previous and the current frames.

There have been two basic approaches to estimate the displacement of pixels of an object. Generally, they can be classified into two types: one is a block-by-block estimation; and the other is a pixel-by-pixel approach.

In the block-by-block basis motion estimation, a block in a current frame is compared with blocks in its previous frame until a best match is determined. From this, an interframe displacement vector (how much the block of pixels has moved between frames) for the whole block can be estimated for the current frame being transmitted. However, in the block-by-block motion estimation, blocking effect at the boundary of a block may occur in a motion compensation process, and poor estimates may result if all pixels in the block do not move in a same way, to thereby decrease the overall coding efficiency.

Using a pixel-by-pixel approach on the other hand, a displacement is determined for each and every pixel. This technique allows a more exact estimation of the pixel value and has the ability to easily handle scale changes (e.g., zooming, movement perpendicular to the image plane). However, in the pixel-by-pixel approach, since a motion vector is determined at each and every pixel, it is virtually impossible to transmit all of the motion vectors to a receiver. Therefore, motion vectors for a set of selected pixels, i.e., feature points, are transmitted to a receiver, wherein each of the feature points is defined as a pixel capable of representing its neighboring pixels so that motion vectors for non-feature points can be recovered from those of the feature points in the receiver. In an encoder which adopts the motion estimation based on feature points, disclosed in a copending commonly owned application, U.S. Ser. No. 08/393,296, filed on Feb. 23, 1995 and entitled "Method and Apparatus for Encoding a Video Signal Using Pixel-by-pixel Motion Estimation", a number of feature points are first selected from all of the pixels contained in the previous frame. Then, motion vectors for the selected feature points are determined, wherein each of the motion vectors representing a spatial displacement between one feature point in the previous frame and a corresponding matching point, i.e., a most similar pixel, in the current frame. Specifically, the matching point for each of the feature points is searched in a search region within the current frame, wherein the search region is defined as a region within a predetermined area which encompasses the position of the corresponding feature point.

Another compression technique which can be implemented readily is a frame decimation method, which reduces the amount of data by encoding and transmitting only certain selected frames of video image and skipping or decimating the remaining frames existing therebetween(see, e.g., "Video Codec for Audiovisual Services at p×64 kb/s," CCITT Recommendation H.261, CDM XV-R 37-E, international Telegraph and Telephone Consultative Committee (CCITT), August 1990).

Usually, the input to the video encoder is a video signal of 30 frames/sec. The frame rate resulting from the skipping of one, two or three frames between every two encoded frames is typically 15, 10 or 7.5 frames/sec, respectively.

To decode a signal encoded in the above encoder, the skipped frames are estimated to reconstruct the video signal of 30 frames/sec; and needs have continued to exist to develop an improved system capable of reconstructing the original video signal which has been transmitted using a frame decimation technique.

SUMMARY OF THE INVENTION

It is, therefore, a primary object of the invention to provide an improved image processing system for encoding and decoding a video signal by employing a motion estimation and compensation technique on a pixel-by-pixel basis using feature points and a frame decimation method.

In accordance with the invention, there is provided an image processing system for processing a video signal including means for encoding the video signal to provide a coded signal and means for decoding the coded signal to provide a reconstructed video signal, wherein said encoding means comprises:

means for selecting a plurality of frames from said video signal, wherein N frames are skipped between a previous frame and a current frame, with N being a positive integer;

means for estimating displacements between the previous frame and the current frame and compensating the previous frame with the estimated displacements to provide a predicted current frame on a pixel-by-pixel basis; and means for subtracting the predicted current frame from the current frame to provide a difference signal and encoding the difference signal and a first set of motion vectors representing the established displacements, to thereby provide the coded signal;

and said decoding means comprises:

means for decoding the coded signal to thereby recover the difference signal and the first set, of motion vectors;

means for estimating displacements between the previous frame and the current frame, based on the recovered first set of motion vectors, and compensating the previous frame with the estimated displacements to thereby reconstruct the predicted current frame;

means for adding the reconstructed predicted current frame with the difference signal to thereby reconstruct the current frame; and means for deciding the N skipped frames between the previous frame and the reconstructed current frame.

BRIEF DESCRIPTION OF THE DRAWINGS

The above and other objects and features of the present invention will become apparent from the following description of preferred embodiments given in conjunction with the accompanying drawings, in which:

FIG. 4 illustrates a video decoder corresponding to the video encoder shown in FIG. 1.

DETAILED DESCRIPTION OF THE PREFERRED EMBODIMENTS

Figure 1:
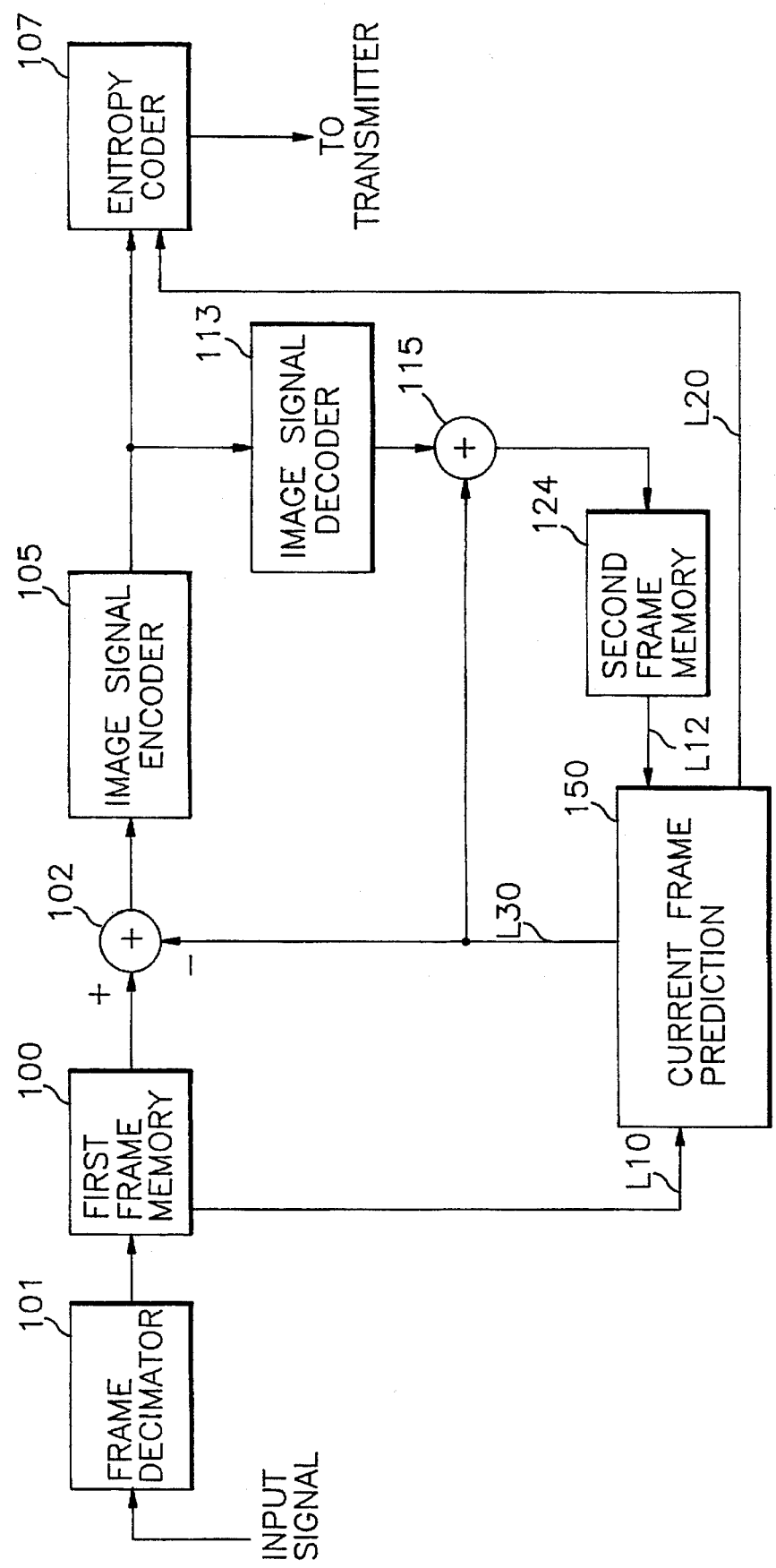
FIG. 1 is a video encoder having a current frame prediction block in accordance with the present invention.

FIG. 1 describes a video encoder employing a motion estimation and compensation technique on a pixel-by-pixel basis and frame decimation.

An input signal is fed to a frame decimator 101. At the frame decimator 101, frames to be encoded are selected by skipping the intervening frames therebetween at a predetermined frame decimation ratio representing the degree of decimation, and fed to a first frame memory 100. For example, the frame decimator 101 selects or uses every other or every third frame of the video signal if the predetermined decimation ratio is 2 or 3, respectively.

As shown in FIG. 1, the selected signal is stored in a first frame memory 100 which is connected to a subtractor 102 and to a current frame prediction block 150 through a line L10.

In the current frame prediction block 150, a current frame signal on the line L10 retrieved from the first frame memory 100 and a reconstructed previous frame signal on a line L12 from a second frame memory 124 are processed to predict the current frame on a pixel-by-pixel basis to generate a predicted current frame signal onto a line L30 and a set of motion vectors for feature points onto a line L20. Details of the current frame prediction block 150 will be described with reference to FIGS. 2 and 3.

The predicted current frame signal on the line L30 is subtracted from a current frame signal at the subtractor 102, and the resultant data, i.e., an error signal denoting a differential pixel value, is dispatched to an image signal encoder 105, wherein the error signal is encoded into a set of quantized transform coefficients, e.g., by using a DCT and any of the known quantization methods. Thereafter, the quantized transform coefficients are transmitted to an entropy coder 107 and an image signal decoder 113. At the entropy coder 107, the quantized transform coefficients from the image signal encoder 105 and the motion vectors fed through the line L20 from the current frame prediction block 150 are coded together by using, e.g., a variable length coding technique for the transmission thereof. In the meantime, the image signal decoder 113 converts the quantized transform coefficients from the image signal encoder 105 back into a reconstructed error signal by employing an inverse quantization and an inverse discrete cosine transform.

The reconstructed error signal from the image signal decoder 113 and the predicted current frame signal on the line L30 from the current frame prediction block 150 are combined at an adder 115 to thereby provide a reconstructed current frame signal to be stored as a previous frame in the second frame memory 124.

Figure 2:
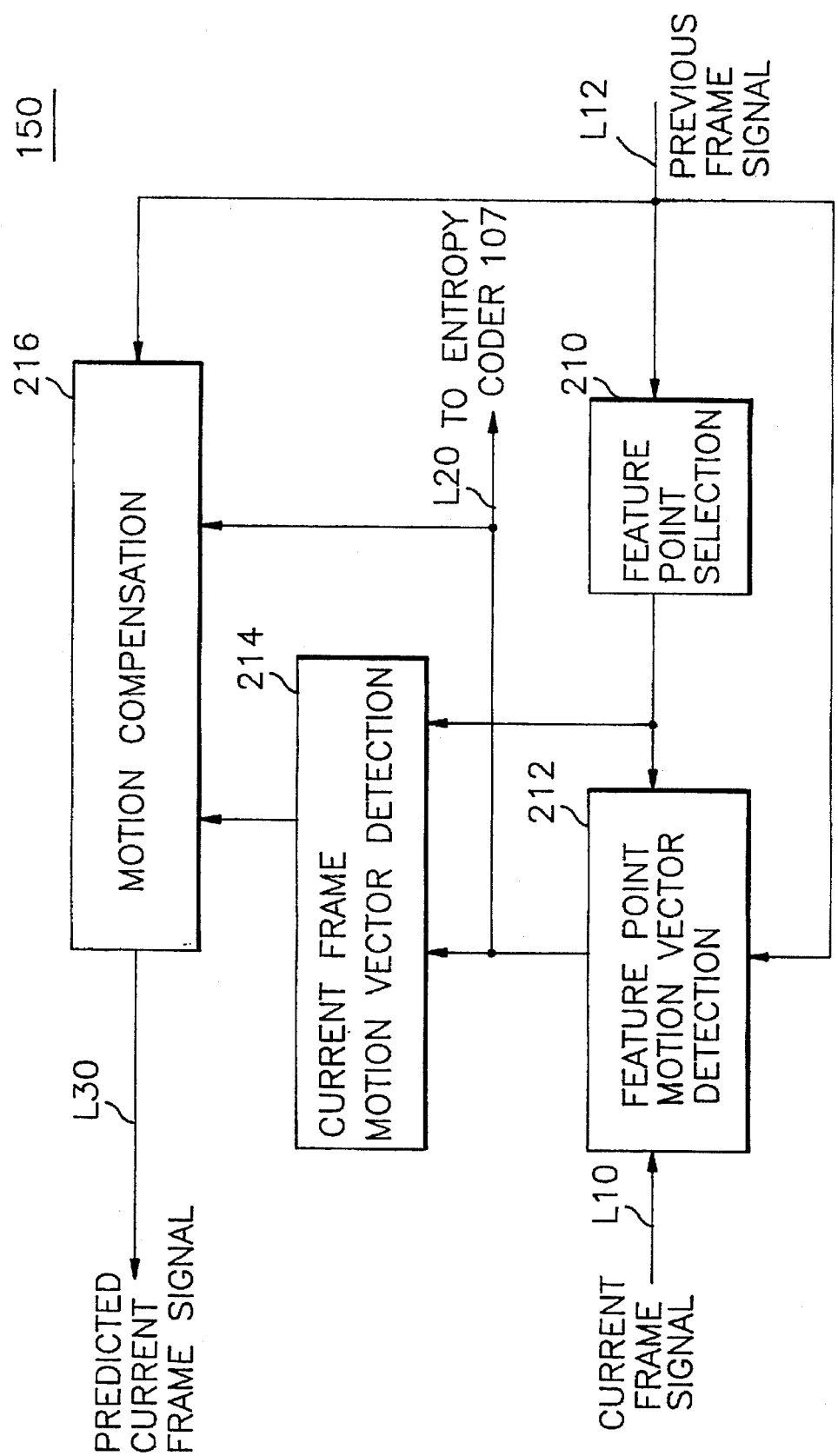
FIG. 2 shows a detailed block diagram of the current frame prediction block of FIG. 1.

Referring to FIG. 2, there are illustrated details of the current frame prediction block 150 shown in FIG. 1. A previous frame signal on the line L12 from the second frame memory 124 is inputted to a feature point selection block 210, a feature point motion vector detection block 212 and a motion compensation block 216.

At the feature point selection block 210, a number of feature points are selected among the pixels contained in the previous frame. Each of the feature points is defined as a pixel which is capable of representing the motion of an object in the frame.

The selected feature points from the feature point selection block 210 are inputted to the feature point motion vector detection block 212 and a current frame motion vector detection block 214. The current frame signal on the line L10 is provided to the feature point motion vector detection block 212.

At the feature point motion vector detection block 212, a first set of motion vectors for the selected feature points is detected. Each of the first set of motion vectors is a spatial displacement between a feature point in the previous frame and a most similar pixel thereto in the current frame.

After detecting the motion vectors for all the feature points, the first set of motion vectors is provided to the current frame motion vector detection block 214 and the entropy coder 107(shown in FIG. 1) via the line L20. In the current frame motion vector detection block 214, a second set of motion vectors for all the pixels contained in the current frame is determined by using of the first set of motion vectors and the feature point from the feature point selection block 210. In order to determine the second set of motion vectors, first, a set of motion vectors for "quasi-feature points" each of which represents a pixel point in the current frame shifted from each of the feature points in the previous frame by each of the first set of motion vectors, is determined. The magnitude of a motion vector for a quasi-feature point is identical to the motion vector for its corresponding feature point but the direction of the two motion vectors is opposite. After determining the motion vectors for all of the quasi-feature points, motion vectors for non-quasi-feature points which are the remaining pixel points in the current frame, are determined as follows.

Figure 3:
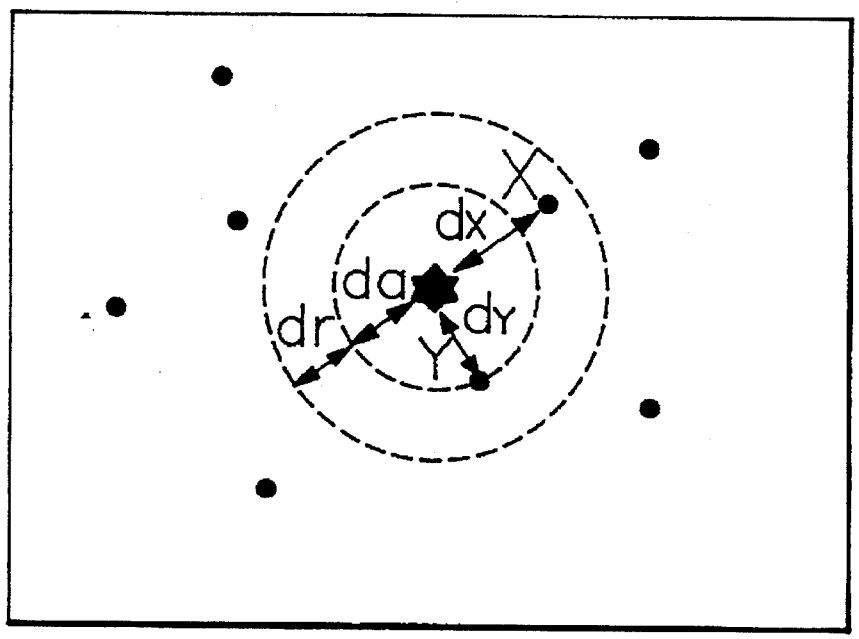
FIG. 3 depicts a method for detecting a motion vector for a non-quasi-feature point.

As shown in FIG. 3, a number of quasi-feature points are irregularly distributed in the entire current frame. A motion vector for a star marked non-quasi-feature point is calculated by averaging those for the quasi-feature points which are placed within a circle boundary having a radius of $d_r+d_a$, wherein $d_a$ is the distance to the nearest quasi-feature point from the star marked pixel position, and $d_r$ is a predetermined expanded radius for including other quasi-feature points to be used in the motion vector calculation. For example, if the nearest quasi-feature point is "Y", and the quasi-feature point "X" is located within the boundary of $d_a+d_r$, the motion vector $(MV_x, MV_y)$ for the star marked pixel is calculated as:

$$(MV_x,MV_y) = \frac{\frac{1}{d_X}(MV_xMV_y)_X + \frac{1}{d_Y}(MV_xMV_y)_Y}{\frac{1}{d_X}+\frac{1}{d_Y}}$$

wherein $d_x$ and $d_y$ are the respective distances of quasi-feature points X and Y from the star marked pixel position; and $(MV_x, MV_y)_x$ and $(MV_x, MV_y)_y$ are the respective motion vectors for the quasi-feature points.

Referring back to FIG. 2, the second set of motion vectors for quasi-feature points and non-quasi feature points are provided to the motion compensation block 216. In the motion compensation block 216, each of the pixels to be contained in a predicted current frame is retrieved from the second frame memory 124(shown in FIG. 1) by using each of the second set of motion vectors.

Referring to FIG. 4, there is shown a video decoder corresponding to the video encoder shown in FIG. 1. A transmitted signal from the video signal encoder is inputted to an entropy decoder 407 wherein the transmitted signal is decoded into the first set of motion vectors on a line L40 and the quantized transform coefficients on a line L42. The motion vectors are provided to a current frame prediction block 450 and a frame interpolator 401 while the quantized transform coefficients are coupled to an image signal decoder 413.

The image signal decoder 413 converts the quantized transform coefficients back into the reconstructed error signal by employing an inverse quantization and an inverse discrete cosine transform.

The current frame prediction block 450 performs substantially the same operation with that of the video signal encoder shown in FIG. 1 except that it provides the predicted current frame signal based on the previous frame signal stored in a frame memory 424 and the first set of motion vectors from the entropy decoder 407.

Therefore, the current frame prediction block 450 is of a similar structure to that of FIG. 2 except that there is no motion estimator such as the feature point motion vector detection block 212 shown in FIG. 2 because the first set of motion vectors transmitted from the encoder is provided thereto on the line L40.

At the feature point selection block of the decoder, feature points are reconstructed from the previous frame decoded and stored in the decoder by the similar method with the encoder. In the current frame motion vector detection block of the decoder, a second set of motion vectors for all of the pixels contained in the current frame is estimated through the use of the first set of motion vectors and the feature point. In the motion compensation block of the decoder, each of the pixels to be contained in a predicted current frame is determined by translating each of the pixels in the previous frame by each of the second set of motion vectors.

The reconstructed error signal from the image signal decoder 413 and the predicted current frame signal on the line L30 from the current frame prediction block 450 are combined at an adder 415, thereby providing the reconstructed current frame signal to the frame memory 424.

The reconstructed frame is also fed to the frame interpolator 401 wherein the N skipped frames between the previous frame and the current frame are reconstructed by using the first set of motion vectors from the entropy decoder 407 as explained hereinafter.

To reconstruct an ith frame between the previous and the current frame, a number of motion vectors and corresponding number of pixel points in an ith skipped frame are first determined, wherein each of the number of motion vectors and the corresponding number of pixel points corresponds to each of the first set of motion vectors; and the smaller value of i represents the temporally closer frame to the previous frame. In determining the motion vectors and the pixel points in the N skipped frames, a motion between two frames may be assumed to be proportional to the time gap between them. Based on the assumption, each of the pixel points in the ith skipped frame is determined by translating each of the feature point in the previous frame by a factor of i/(N+1) multiplied by one of the first set of the motion vectors for the feature points in the previous frame. Then, each of the number of motion vector between the previous frame and the ith skipped frame is determined by multiplying the motion vector for the corresponding feature point in the previous frame by the factor of i/(N+1).

Motion vectors for the remaining pixels contained in the ith skipped frame are determined based on the number of motion vectors and the pixel points in the ith frame using the method explained with reference to FIGS. 2 and 3. Then, the pixel values of the ith frame can be determined easily from the previous frame and the motion vectors for the pixels in the ith frame, to thereby provide a reconstructed input signal.

In a similar manner, it is possible to reconstruct the ith frame from the current frame. In this case, each of the pixel points in the ith skipped frame is determined by translating each of the feature point in the current frame by a factor of (N+1-i)/(N+1) multiplied by the corresponding motion vector; and the motion vector between the current frame and the ith skipped frame is determined by multiplying the corresponding motion vector of the current frame by the factor of (N+1-i)/(N+1). Generally, it is preferable to reconstruct a skipped frame by using a temporally closer frame out of the previous frame and the current frame.

While the present invention has been shown and described with reference to the particular embodiments, it will be apparent to those skilled in the art that many changes and modifications may be made without departing from the spirit and scope of the invention as defined in the appended claims.

What is claimed is:

1. An image processing system for processing a video signal including means for encoding the video signal to provide a coded signal and means for decoding the coded signal to provide a reconstructed video signal, wherein said encoding means comprises: means for selecting a plurality of frames from said video signal, wherein N frames are skipped between a previous frame and a current frame, with N being a positive integer;

means for selecting a number of feature points from the pixels contained in the previous frame, each of the feature points being a pixel point capable of representing the motion of an object therein;

means for comparing the previous frame and the current frame to detect a first set of motion vectors for each of the selected feature points, each of the first set of motion vectors representing a spatial displacement between one of the selected feature points in the previous frame and a most similar pixel in the current frame;

means for deriving a second set of motion vectors for all of the pixels contained in the current frame based on the first set of motion vectors and the feature points;

means for compensating the previous frame with the second set of motion vectors to produce the predicted current frame; and means for subtracting the predicted current frame from the current frame to provide a difference signal and encoding the difference signal and the first set of motion vectors representing the estimated displacements, to thereby provide the coded signal;

and said decoding means comprises:

means for decoding the coded signal to thereby recover the difference signal and the first set of motion vectors;

means for estimating displacements between the previous frame and the current frame, based on the recovered first set of motion vectors, and compensating the previous frame with the estimated displacements to thereby reconstruct the predicted current frame;

means for adding the reconstructed predicted current frame with the difference signal to thereby reconstruct the current frame; and means for deciding the N skipped frames between the previous frame and the reconstructed current frame.

2. The apparatus of claim 1, wherein said estimating means in the decoding means includes:

means for reconstructing said number of feature points based on the previous frame;

means for reconstructing the second set of motion vectors for all of the pixels contained in the current frame based on the recovered first set of motion vectors and the reconstructed feature points; and means for compensating the previous frame with the reconstructed second set of motion vectors to produce the reconstructed predicted current frame.

3. The apparatus of claim 2, wherein said means for deciding the N skipped frames includes:

means for determining a number of motion vectors and a corresponding number of pixel points in an ith skipped frame, wherein each of the corresponding number of pixel points in the ith skipped frame is determined by translating each of the feature points in the previous frame by a factor of $i/(N+1)$ multiplied by one of the first set of motion vectors corresponding to said each of the feature points in the previous frame, and each of the number of motion vectors between said each of the corresponding number of pixel points in the ith skipped frame and said each of the feature points in the previous frame is determined by multiplying said one of the first set of motion vectors by the factor of $i/(N+1)$; and means for determining motion vectors for all of the pixels contained in the ith skipped frame using said number of motion vectors and the corresponding number of pixel points in the ith frame, to thereby provide the ith frame.

4. The apparatus of claim 2, wherein said means for deciding the N skipped frames includes:

means for determining a number of motion vectors and a corresponding number of pixel points in an ith skipped frame, wherein each of the corresponding number of pixel points in the ith skipped frame is determined by translating each of the feature points in the reconstructed current frame by a factor of $(N+1-i)/(N+1)$ multiplied by one of the first set of motion vectors corresponding to said each of the feature points in the reconstructed current frame, and each of the number of motion vectors between said each of the corresponding number of pixel points in the ith skipped frame and said each of the feature points in the reconstructed current frame is determined by multiplying said one of the first set of motion vectors by the factor of $(N+1-i)/(N+1)$; and means for determining motion vectors for all of the pixels for all of pixels contained in the ith skipped frame using said number of motion vectors and the corresponding number of pixel points in the ith frame, to thereby provide the ith frame.

* * * * *